United States Patent
Rogan

(10) Patent No.: US 11,527,060 B2
(45) Date of Patent: Dec. 13, 2022

(54) LOCATION DETERMINATION SERVICE BASED ON USER-SOURCED IMAGE UPDATES

(71) Applicant: Uber Technologies, Inc., San Francisco, CA (US)

(72) Inventor: Aaron Matthew Rogan, Westminster, CO (US)

(73) Assignee: Uber Technologies, Inc., San Francisco, CA (US)

( * ) Notice: Subject to any disclaimer, the term of this patent is extended or adjusted under 35 U.S.C. 154(b) by 561 days.

(21) Appl. No.: 16/712,835

(22) Filed: Dec. 12, 2019

(65) Prior Publication Data

US 2020/0232804 A1 Jul. 23, 2020

Related U.S. Application Data

(60) Provisional application No. 62/812,101, filed on Feb. 28, 2019, provisional application No. 62/812,098, (Continued)

(51) Int. Cl.
*G06Q 10/02* (2012.01)
*G06Q 10/04* (2012.01)
(Continued)

(52) U.S. Cl.
CPC ........... *G06V 20/00* (2022.01); *G01C 21/343* (2013.01); *G01C 21/3438* (2013.01); (Continued)

(58) Field of Classification Search
CPC .............. G06F 16/5866; G06F 16/587; G06F 16/7837; G06Q 10/02; G06Q 30/0209; (Continued)

(56) References Cited

U.S. PATENT DOCUMENTS

| 8,483,715 B2 | 7/2013 | Chen |
| 8,806,653 B2 | 8/2014 | Di Rienzo |

(Continued)

FOREIGN PATENT DOCUMENTS

| DE | 102006034413 A1 | 1/2008 |
| EP | 2241858 A2 | 10/2010 |

OTHER PUBLICATIONS

European Patent Office, Extended European Search Report and Opinion, EP Patent Application No. 18854606.3, dated Apr. 23, 2021, ten pages.

(Continued)

*Primary Examiner* — Justin R. Blaufeld
(74) *Attorney, Agent, or Firm* — Fenwick & West LLP

(57) ABSTRACT

Systems and methods are disclosed herein for recovering inaccurate or missing base map data for an area while providing riders with incentive to refrain from selecting an alternate transportation service while experiencing increased wait times. A service receives a request for a driver and locates a driver to provide the service. The service determines whether the wait time for the rider exceeds a threshold wait time established by the service. If the service determines that the wait time exceeds the threshold wait time, the service identifies an object within a threshold vicinity of the rider known to have inaccurate or missing base map data. The service transmits a prompt for the rider to capture an image of the object. The service receives a rendering of the captured images from the client device, and activates a function via the client device if the images accurately capture the identified objects included in the prompt.

20 Claims, 6 Drawing Sheets

Related U.S. Application Data filed on Feb. 28, 2019, provisional application No. 62/812,107, filed on Feb. 28, 2019, provisional application No. 62/802,145, filed on Feb. 6, 2019, provisional application No. 62/801,012, filed on Feb. 4, 2019, provisional application No. 62/801,010, filed on Feb. 4, 2019, provisional application No. 62/795,988, filed on Jan. 23, 2019.

(51) Int. Cl.

| | | |
|---|---|---|
| *G06Q 30/02* | (2012.01) | |
| *G06Q 50/30* | (2012.01) | |
| *G01C 21/34* | (2006.01) | |
| *G01C 21/36* | (2006.01) | |
| *G01S 19/48* | (2010.01) | |
| *G06F 16/58* | (2019.01) | |
| *G06F 16/587* | (2019.01) | |
| *G06F 16/783* | (2019.01) | |
| *G06F 3/01* | (2006.01) | |
| *G06K 9/62* | (2022.01) | |
| *G06T 19/00* | (2011.01) | |
| *G06T 19/20* | (2011.01) | |
| *G06V 20/00* | (2022.01) | |
| *G06V 20/20* | (2022.01) | |
| *G06V 20/56* | (2022.01) | |
| *H04B 1/3827* | (2015.01) | |
| *H04L 67/52* | (2022.01) | |
| *H04N 5/232* | (2006.01) | |
| *H04W 4/029* | (2018.01) | |
| *H04W 4/021* | (2018.01) | |
| *H04W 4/18* | (2009.01) | |

(52) U.S. Cl.
CPC .......... *G01C 21/3644* (2013.01); *G01S 19/48* (2013.01); *G06F 3/016* (2013.01); *G06F 16/587* (2019.01); *G06F 16/5866* (2019.01); *G06F 16/7837* (2019.01); *G06K 9/6201* (2013.01); *G06K 9/6215* (2013.01); *G06Q 10/02* (2013.01); *G06Q 10/047* (2013.01); *G06Q 30/0209* (2013.01); *G06Q 30/0235* (2013.01); *G06Q 50/30* (2013.01); *G06T 19/006* (2013.01); *G06T 19/20* (2013.01); *G06V 20/20* (2022.01); *G06V 20/56* (2022.01); *H04B 1/3827* (2013.01); *H04L 67/52* (2022.05); *H04N 5/23222* (2013.01); *H04W 4/021* (2013.01); *H04W 4/029* (2018.02); *H04W 4/185* (2013.01); *G06T 2200/24* (2013.01); *G06T 2219/024* (2013.01)

(58) Field of Classification Search
CPC .. G06Q 30/0235; G06Q 50/30; G06T 19/006; G06T 2200/24; G06T 2219/024
See application file for complete search history.

(56) References Cited

U.S. PATENT DOCUMENTS

| | | | |
|---|---|---|---|
| 9,894,484 | B1 | 2/2018 | Pao et al. |
| 10,573,020 | B1 | 2/2020 | Sokolov et al. |
| 10,643,104 | B1* | 5/2020 | Xue ................ G06V 20/70 |
| 10,834,523 | B1 | 11/2020 | Rao |
| 2010/0250113 | A1 | 9/2010 | Miyata |
| 2010/0250136 | A1 | 9/2010 | Chen |
| 2011/0313779 | A1* | 12/2011 | Herzog ............. G06Q 30/02 |
| | | | 715/744 |
| 2012/0176500 | A1 | 7/2012 | Muto et al. |
| 2013/0090090 | A1 | 4/2013 | Rivere |
| 2014/0100995 | A1 | 4/2014 | Koshy et al. |
| 2014/0172640 | A1 | 6/2014 | Argue et al. |
| 2015/0154851 | A1* | 6/2015 | Vincent ............. G06F 16/9537 |
| | | | 340/539.13 |
| 2015/0287108 | A1* | 10/2015 | Monk ................ G07F 17/42 |
| | | | 705/5 |
| 2016/0147826 | A1* | 5/2016 | Mishra ................ G01C 21/32 |
| | | | 707/736 |
| 2017/0059347 | A1 | 3/2017 | Flier et al. |
| 2017/0103571 | A1 | 4/2017 | Beaurepaire |
| 2017/0161958 | A1 | 6/2017 | Eilat |
| 2017/0243403 | A1 | 8/2017 | Daniels et al. |
| 2017/0292313 | A1 | 10/2017 | Herman et al. |
| 2017/0343375 | A1 | 11/2017 | Kamhi et al. |
| 2017/0358147 | A1 | 12/2017 | Brinig et al. |
| 2018/0122024 | A1* | 5/2018 | Carpenter .............. G06Q 50/30 |
| 2018/0136002 | A1 | 5/2018 | Ishikawa et al. |
| 2019/0017839 | A1 | 1/2019 | Eyler et al. |
| 2019/0063935 | A1 | 2/2019 | Badalamenti et al. |
| 2019/0072408 | A1 | 3/2019 | Lee |
| 2019/0164177 | A1* | 5/2019 | Yeh ................ G06Q 10/06311 |
| 2019/0204992 | A1 | 7/2019 | Bowden et al. |
| 2019/0206029 | A1 | 7/2019 | Koyama et al. |
| 2019/0251719 | A1 | 8/2019 | Wang et al. |
| 2019/0289260 | A1* | 9/2019 | Park ..................... H04W 4/50 |
| 2019/0384294 | A1 | 12/2019 | Shashua et al. |
| 2020/0068345 | A1 | 2/2020 | Ondruska et al. |
| 2020/0124427 | A1 | 4/2020 | Kline et al. |
| 2020/0164274 | A1* | 5/2020 | Zhang ................ A63F 13/533 |
| 2020/0363216 | A1* | 11/2020 | Elvanoglu ............ G08G 1/005 |
| 2021/0279969 | A1* | 9/2021 | Cowburn ................ G06T 17/05 |

OTHER PUBLICATIONS

United States Preinterview first office action, U.S. Appl. No. 16/712,902, dated Mar. 4, 2021, six pages.
United States First Action Interview Pre-Interview Communication, U.S. Appl. No. 16/712,883, dated Jul. 22, 2021, four pages.
United States First Action Interview Office Action, U.S. Appl. No. 16/712,883, dated Sep. 8, 2021, five pages.
United States Office Action, U.S. Appl. No. 16/712,824, dated Mar. 24, 2022, 13 pages.

* cited by examiner

500

Receive request for transportation service from a client device.
510

Determine if wait time for transportation service exceeds threshold wait time.
520

Does wait time exceed threshold wait time? 530 — No

Yes

Identify object within threshold vicinity of location of client device.
540

Send prompt to client device for user to capture images of identified object.
550

Receive rendering of the images captured by the user of the client device.
560

Cause client device to activate function in response to receiving rendered images.
570

FIG. 5

LOCATION DETERMINATION SERVICE BASED ON USER-SOURCED IMAGE UPDATES

CROSS-REFERENCE TO RELATED APPLICATION

This application claims the benefit of U.S. Provisional Application No. 62/802,145, filed Feb. 6, 2019, U.S. Provisional Application No. 62/795,988, filed Jan. 23, 2019, U.S. Provisional Application No. 62/812,101, filed Feb. 28, 2019, U.S. Provisional Application No. 62/812,098, filed Feb. 28, 2019, U.S. Provisional Application No. 62/801,010, filed Feb. 4, 2019, U.S. Provisional Application No. 62/801,012, filed Feb. 4, 2019, U.S. Provisional Application No. 62/812,107, filed Feb. 28, 2019, which are incorporated by reference in their entirety.

TECHNICAL FIELD

The present disclosure relates to location identification and in particular to capturing images of objects in areas known to include erroneous or outdated base map data.

BACKGROUND

Many systems use global positioning system (GPS) coordinates to estimate the position of persons carrying client devices. For example, a person carrying a client device (referred to herein as a "rider") may wish to arrange for transportation from his or her present location to another location, and may execute an application (e.g., a transportation service application and/or ridesharing application) on his or her client device to obtain transportation from a transportation provider (referred to herein as a "driver"). Existing systems in this scenario match the rider with a driver, and instruct the driver to travel to a location of the rider for pick-up. However, the GPS coordinates used to estimate the position of the rider may be unknown or inaccurate due to interference or reception problems, such as those caused by tall buildings that distort satellite signals (referred to herein as "urban canyons"), for example. This erroneous GPS data (e.g., inaccurate or missing data) may cause inconveniences for the driver while attempting to locate the rider for pick-up, and/or designating a pick-up location altogether. Similarly, this scenario may cause inconveniences for the rider while waiting for the driver to travel to the pick-up location given the potentially inaccurate data. Furthermore, increased wait time for a rider while waiting for a driver may result in the rider considering alternate transportation services rather than the requested service.

Existing systems seek to solve the technical problem of locating a rider based on erroneous or outdate GPS data by prompting riders to manually confirm their locations within the application. However, these systems can be cumbersome for riders that are unfamiliar with their surroundings or unsure of their exact locations, and do nothing to recover inaccurate or missing GPS data in the surrounding area. Additionally, many of these systems do not account for a rider's consideration of using an alternate transportation service while experiencing increased wait times. The technical problem of correcting erroneous or outdated GPS data while providing content to a rider via an application in response to increased wait times is not addressed by existing systems.

SUMMARY

Systems and methods are disclosed herein for correcting erroneous or outdated rendering information in a base map for an area that is used to provide more precise location estimates than GPS traces are able to provide. The systems and methods disclosed herein are additionally directed to gathering such information from riders while providing riders with incentive to refrain from selecting an alternate transportation service while experiencing increased wait times. To this end and others, a service (e.g., an application that facilitates a transportation service) receives a request for a driver (e.g., from a client device of a rider) and accordingly locates a driver to provide the service. For example, if a rider requests a ride, the service may locate a driver to provide the service that is within a threshold vicinity near the rider to minimize wait time. While the driver is travelling to the location of the rider (e.g., as indicated by the location of client device), the service determines whether the wait time for the rider exceeds a threshold wait time established by the service. For example, a threshold wait time might represent a number of minutes that an administrator has determined to correspond to a likelihood that the rider will cancel the ride request. If the service determines that the wait time exceeds the threshold wait time, the service identifies an object, or objects, within a threshold vicinity of the rider known to have erroneous or outdated base map data, and may incentivize the rider to capture images of the objects for the purpose of updating the base map data used to drive more accurate location estimates.

The service then transmits, to the client device, a prompt for the rider to capture an image of the object, or objects, known to have erroneous or outdated base map data. For example, the service may provide the rider with an augmented reality (AR) gamification experience via the client device in which the rider is prompted to throw virtual basketballs into a trash can within an urban canyon, where images are captured of the trash can to update a rendered image database that uses images to improve location estimations. In another example, the rider may be prompted to capture images of areas within the threshold vicinity that undergo frequent construction, or other such development, to stale base map data for those areas.

The service receives a rendering of the captured images from the client device, and activates a function via the client device if the images accurately capture the identified objects included in the prompt. For example, if a rider sufficiently captures images of a construction zone while participating in an AR gamification experience, the service may provide the rider with a discount to be used toward a subsequent ride, thus improving the incentive of the rider to not cancel the ride request and to capture images to supplement the database. As discussed below, in some embodiments, the service is implemented within the client device.

BRIEF DESCRIPTION OF THE DRAWINGS

FIG. 5 is a process flow diagram illustrating a image capturing process, according to one embodiment.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
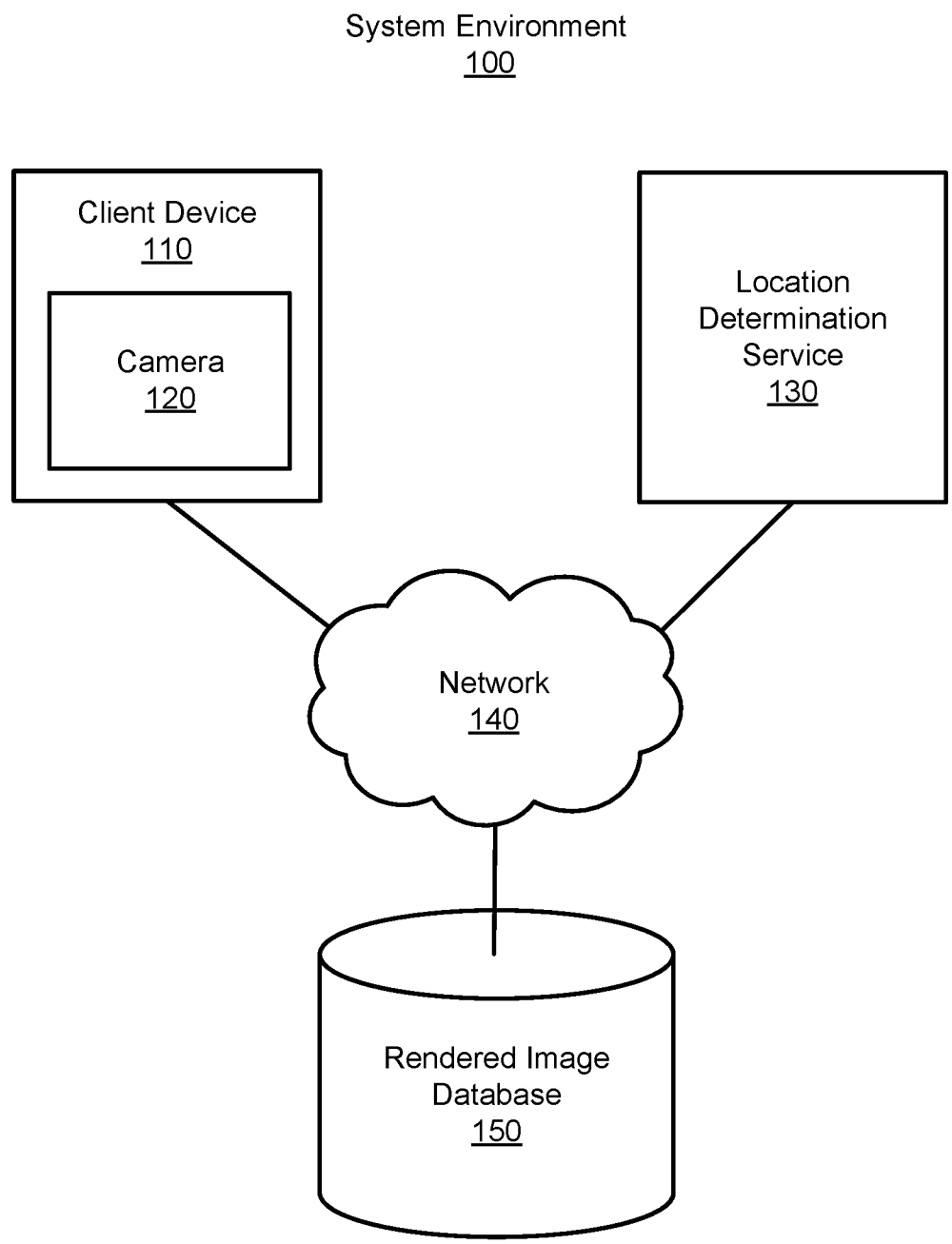
FIG. 1 is a block diagram illustrating an environment in which a rideshare system operates, according to one embodiment.

FIG. 1 is a block diagram illustrating a system environment 100 for correcting erroneous or outdated base map data and keeping riders engaged while waiting for a transportation service, according to one embodiment. In the embodiment illustrated in FIG. 1, the system environment 100 includes a client device 110 with a camera 120, a location determination service 130, a network 140, and a rendered image database 150. In other embodiments, different and/or additional entities can be included in the system architecture.

The client device 110 executes an application (e.g., a transportation service and/or rideshare application) where a rider may request a transportation service from the rider's current location to a desired destination, and where the rider may be connected to a driver who also uses the rideshare application, where the driver will provide the ride. In an embodiment, the vehicle with which a ride is provided may be an autonomous vehicle. In such a scenario, the autonomous vehicle is providing the ride without a human driver. References are made throughout to a "driver;" however, this is merely for convenience, and any such-described activity may be undertaken by an autonomous vehicle acting as the driver, rather than a human being. The application may include a user interface that displays a map of the rider's current location as well as a pick-up location within a threshold vicinity of the rider (e.g., as designated with a pin or other indicator). The application may prompt the rider to travel to the pick-up location so that the driver may locate and pick-up the rider to complete the transportation service.

In an embodiment, client device 110 automatically captures one or more images using camera 120. For example, client device 110 captures an image upon launching a rideshare application, upon requesting a ride, and the like. In another embodiment, client device 110 captures one or more images using camera 120 upon request from the location determination service 130 (e.g., to correct erroneous GPS data, update outdated GPS data, obtain missing GPS data, and the like). Automatic capturing of one or more images may be an opt-in feature, where the application by default does not automatically capture images using camera 120, and where the application has a setting that, if selected by a user of client device 110, enables the application to automatically capture the images. Similarly, capturing images upon request from the location determination service 130 may be an opt-in feature, where the rider is prompted to capture images and is presented with an option to use the camera 120 for providing rendered images to the location determination service 130. Each prompt may be accompanied with one or more incentives offered to the rider in exchange for opting-in and capturing the requested images. For example, the location determination service 130 may prompt a rider with a request to capture images of a near-by object using the client device 110, where the request is accompanied with a discount to be applied toward the rider's next request for the transportation service.

In some embodiments, client device 110 transmits the image(s) to the location determination service 130 over network 140, where location determination service 130 receives the image(s) and compares them to known images, stored at rendered image database 150, to correct or update erroneous or outdated base map data. The known images, in the aggregate, form a base map of either the world at large, or a sub-section of the world (e.g., a region in which client device 110 is presently located. In one embodiment, each entry in rendered image database 150 includes a rendered image of an object, a timestamp, and a location associated with the object (e.g., an area within a map). In some embodiments, the functionality of location determination service 130 and/or rendered image database 150 is located wholly within client device 110, and thus need not be accessed by network 140, as depicted. Rendered image database 150 may be accessed by location determination service 130 directly, or over network 140. Location determination service 130 may be a module of an application, such as a rideshare application, or may be a component of a transportation service generally. In some embodiments where location determination service 130 is a module of the application, some or all of the contents of rendered image database 150 are transmitted to the client device for performing localization at the client device. The functionality of location determination service 130 will be described in further detail below with respect to FIGS. 2-4.

Identifying Regions Prone to Erroneous GPS Readings

Figure 2:
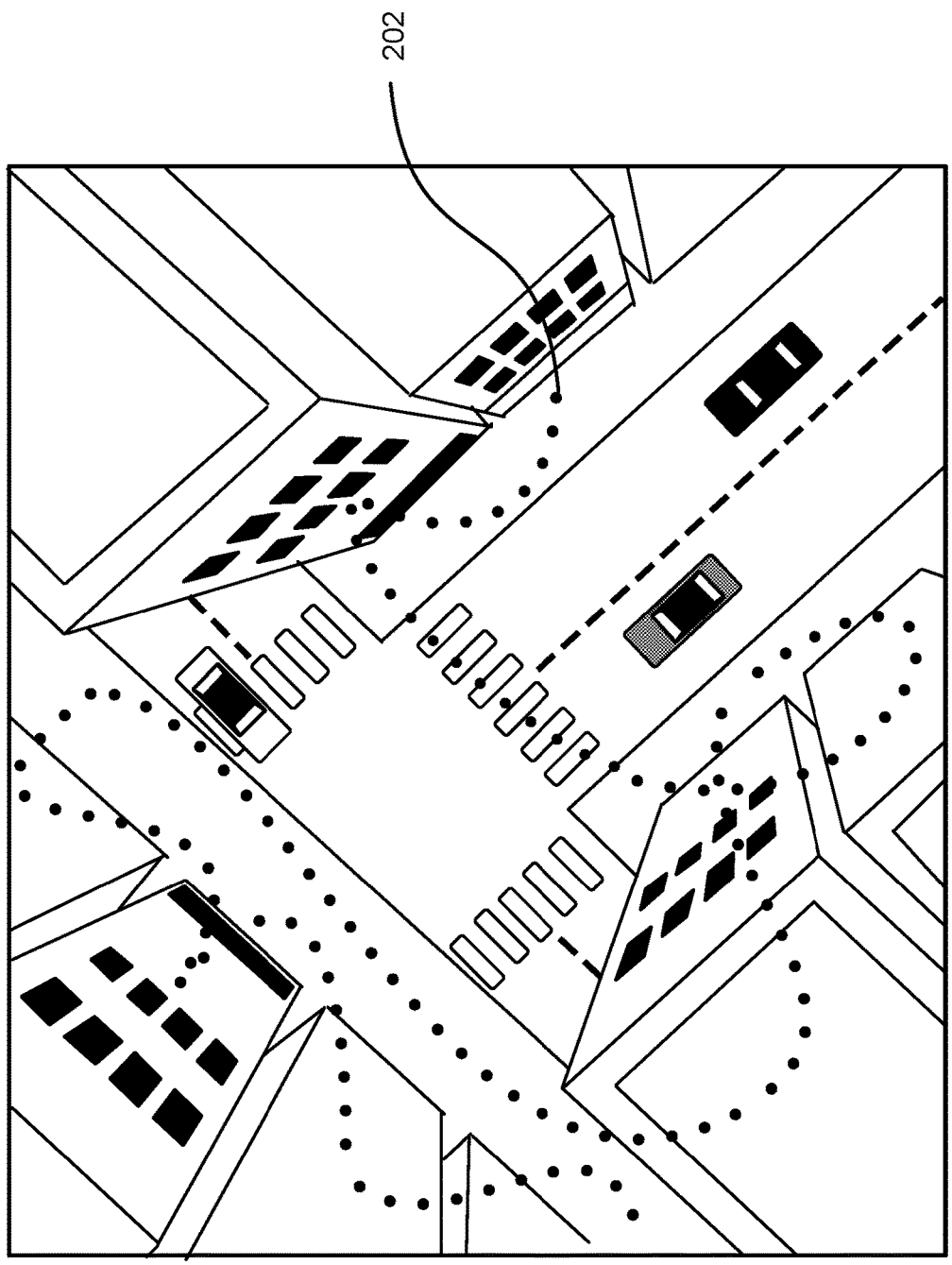
FIG. 2 is an illustration of GPS traces in a region where GPS signals are inaccurate, according to one embodiment.

FIG. 2 is an illustration of GPS traces in a region where GPS signals are inaccurate, according to one embodiment. Region 200 includes GPS traces 202 of various client devices as derived from the client devices. As an illustrative example, the GPS traces 202 were derived from client devices that are on, or directly adjacent, to a road. Because of the existence of tall buildings within region 200, the GPS signals used to derive the GPS traces are distorted and provide inaccurate GPS traces. This is evidenced by the GPS traces being at locations that are not on, or directly adjacent to, a road.

Region 200 is exemplary of an urban canyon known to location determination service 130 to have, or cause, erroneous or outdated base map data (e.g., inaccurate or missing data). The identification of various regions, like region 200, which are associated with erroneous GPS data may be performed automatically by location determination server 130, or may be made based on manual feedback from riders. For example, location determination service 130 may detect that users of a rideshare application in a given location set a pick-up pin at a location different from their GPS traces at a frequency that exceeds a threshold defined by an administrator, and may determine therefrom that GPS data derived from client devices within that region are likely erroneous. As another example, location determination service 130 may detect that GPS traces of users (e.g., drivers) of a rideshare application are, at a frequency above a threshold, in areas inaccessible to drivers, such as within buildings or parks that do not have road access, and may determine therefrom that GPS data derived from client devices within that region are likely erroneous. As yet another example, location determination service 130 may receive feedback from users that their client devices are determining erroneous locations based on GPS sensors of those client devices, and may determine therefrom that GPS data derived from client devices within that region are likely erroneous.

Exemplary Threshold Vicinity

Figure 3:
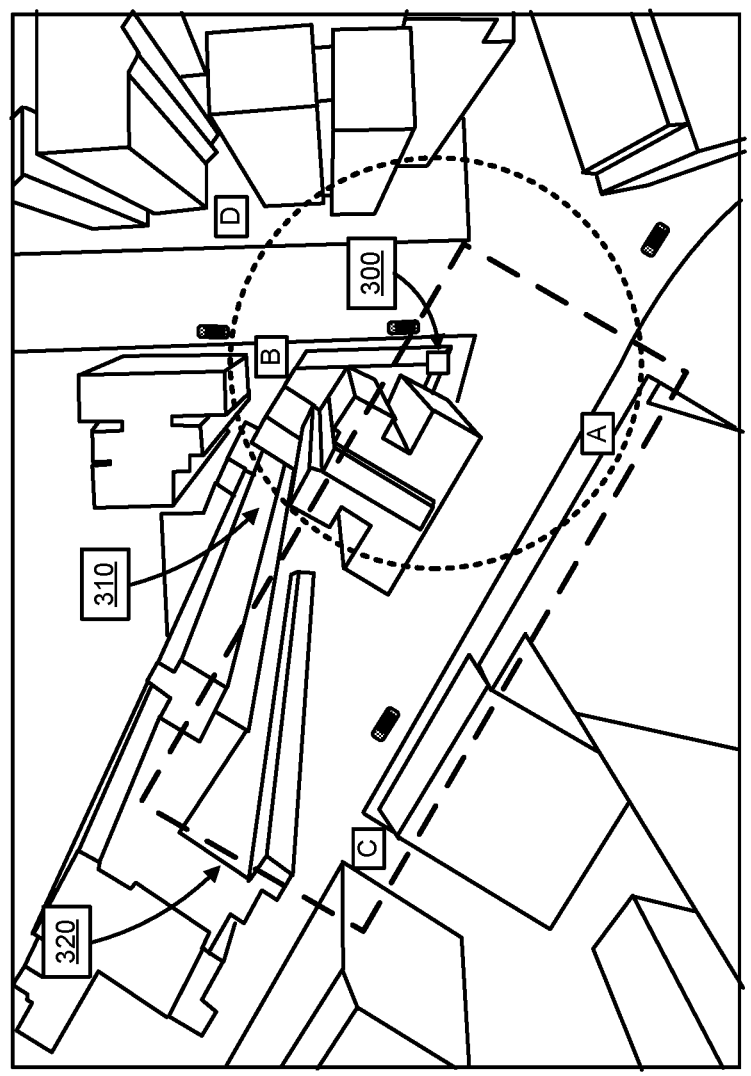
FIG. 3 is an illustration of a threshold vicinity encompassing a user of a client device, according to one embodiment.

FIG. 3 is an example of a threshold vicinity encompassing a rider, according to one embodiment. The term threshold vicinity, as used herein, may refer to an area in which a pick-up location may be designated for a rider. In the embodiment illustrated in FIG. 3, a rider 300 located on a corner within an urban canyon has requested a transportation service, and a threshold vicinity 310 has subsequently been designated by the location determination service 130. This threshold vicinity 310 represents an area in which a pick-up location may be designated for the rider to receive a ride from a driver of the transportation service. In the event that a wait time experienced by the rider after requesting the transportation service exceeds a threshold wait time (e.g., as determined by an administrator associated with the location determination service 130), the threshold vicinity 310 also serves to delineate an area in which the rider may be prompted to travel and capture images of objects known to exhibit erroneous or outdated base map data. In the example illustrated in FIG. 3, these areas including objects known to exhibit erroneous or outdated base map data are labeled areas A, B, C, and D, and are distributed, e.g., throughout the urban canyon or throughout a region where the objects are otherwise known to exhibit erroneous or outdated base map data. In some embodiments, the base map data may be known to be erroneous or outdated based on feedback from other drivers and/or riders indicating that there are errors in location determination derived from the base map corresponding to a particular location. In some embodiments, the base map data may be known to be erroneous or outdated based on a determination that a new establishment has been created (e.g., based on scraping blogs or news articles for press releases of openings of establishments like restaurants). Any method of determining that base map data is erroneous or outdated is within the scope of this disclosure.

Along with the prompt to capture images, the location determination service 130 provides an opportunity (e.g., instructs the application to generate for display selectable options) for the rider to accept or reject the prompt to capturing images. For example, the location determination service 130 may provide to the rider 300 an opportunity to travel to, and capture images of, one of the areas including objects known to exhibit erroneous or outdated base map data (e.g., A, B, C, and/or D) or to remain at the pick-up location until driver arrives. This allows the rider to choose whether to opt-in to the prompt to capture images, or to simply continue to wait at the pick-up location. The location determination service 130 may provide an incentive associated with the prompt to capture images, such as a discount for future transportation services, exclusive promotions, or other such incentive in exchange for the rider capturing images of the specified areas within the threshold vicinity. The threshold vicinity 310 depicted in FIG. 3 merely serves as an exemplary embodiment, and may be adjusted to include larger or smaller areas and/or a different shaped boundary (other than circular).

In one embodiment, the threshold vicinity 310 may encompass a larger or smaller area based on a wait time associated with the transportation service. For example, if a wait time is expected to exceed the threshold wait time by a significant period of time (e.g., greater than 10 minutes), the location determination service 130 may increase the circumference of the threshold vicinity 310 to include additional areas having erroneous or outdated base map data farther away from the rider given that the rider has more time to travel (e.g., walk) to the areas before the driver arrives. For example, if the threshold vicinity 310 illustrated in FIG. 3 was initially designated for the rider in response to the rider's wait time exceeding the threshold wait time, the threshold vicinity 310 includes only areas A and B. How- ever, as the wait time increases, the size of the threshold vicinity may also increase to include area D, for example. Conversely, if the wait time is expected to exceed the threshold wait time by a smaller margin of time (e.g., 10 minutes or less), the circumference of the threshold vicinity 310 may remain the same or be decreased to include only those areas having objects closer to the rider given the decreased amount of time the rider is given to travel to the objects before the driver approaches. In the example illustrated in FIG. 3, if the wait time exceeds the threshold wait time by only a narrow margin, the size of the threshold vicinity 310 may remain the same or be decreased to include only area B given that it is slightly closer to the rider than area A, and does not require the rider to cross the street. In some embodiments, location determination service 130 may determine that the driver will approach the determined pickup location faster than estimated. In response to such a determination, location determination service 130 may adjust the pickup location to a revised pickup location to an area closer to the rider than originally selected, or to a location that does not correspond to outdated or erroneous base map data.

In one embodiment, the threshold vicinity 310 may be determined by the location determination service 130 based on information known about the rider. For example, if the rider was previously assigned a large threshold vicinity 310 (e.g., including several city blocks) for a previous transportation service request, and the rider successfully traveled to the area, or areas, designated within the threshold vicinity, the location determination service 130 may elect to designate another large threshold vicinity 310. Similarly, if the rider was previously unable to travel to the area, or areas, designated within a given threshold vicinity 310, the location determination service 130 may instead elect to designate a smaller threshold vicinity 310 than those previously designated. In addition, the location determination service 130 may account for a rider's age when determining a threshold vicinity 310. For example, if the location determination service 130 receives a request for a transportation service from a rider that is in college, it might determine that the rider most likely does a large amount of walking (e.g., between classes on a college campus), and accordingly present the rider with a large threshold vicinity. In contrast, if the location determination service 130 identifies that a rider is elderly and/or experiencing health problems, a smaller threshold vicinity may be presented. In both of these examples, the rider would additionally receive an opportunity to accept or reject the prompt to capture images, and an incentive associated with the prompt.

In one embodiment, the location determination service 130 may designate a threshold vicinity 310 based on a route to be taken by the driver upon receiving the rider at the pick-up location, such as a most efficient route, for example. If the location determination service 130 identifies that the driver might experience difficulties reaching the rider at certain locations (e.g., due to one way streets, heavy traffic, construction, street closures, and the like) the location determination service 130 might assign a threshold vicinity that excludes areas that are inaccessible to the driver. Designating a threshold vicinity based on driver accessibility may alter the shape of the boundary of the threshold vicinity 310 to include only accessible areas while excluding inaccessible areas. For example, if the street that includes positions B and D in FIG. 3 is undergoing a road closure due to construction, the location determination service 130 may designate a rectangular shaped threshold vicinity encompassing the street that includes positions A and C, such as threshold vicinity 320. Designating a threshold vicinity based on route also serves to further minimize wait times given that the rider is prompted to travel to an area that may be more accessible to the driver, rather than requiring the driver to travel to the inaccessible area.

Exemplary Rideshare Application User Interface

Figure 4:
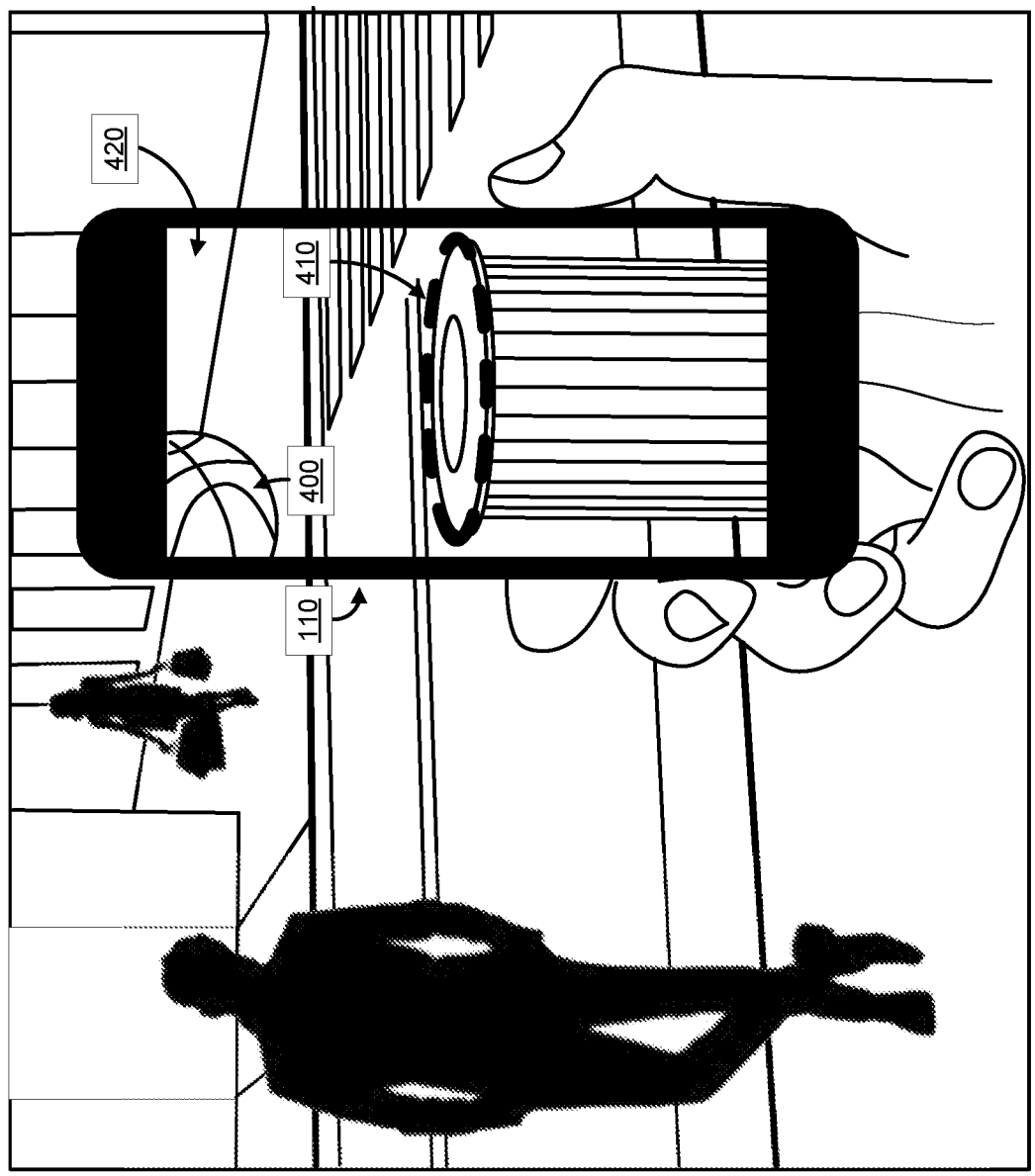
FIG. 4 is an illustration of a user interface of an application prompting a user to capture an image via augmented reality gamification, according to one embodiment.

FIG. 4 is an illustration of a user interface of an application prompting a user for an image of an object in connection with improving location estimation, according to one embodiment. Execution by a processor of client device 110 of an application, such as a rideshare application, causes the rideshare application to launch, which in turn commands client device 110 to generate for display user interface 420. The commands of the application may, in whole or in part, be driven by commands received from location determination service 130. In one embodiment, the application causes user interface 420 to display a pin denoting a pick-up location to which the rider is to travel to in order to be received by a driver of the transportation service.

In response to determining that a rider's wait time exceeds a threshold wait time, the application causes the user interface 420 to display a prompt for the rider to capture images of one or more objects. In particular, the user interface 420 displays instructions for the rider to travel to an area known to be associated with erroneous or outdated base map data (e.g., areas A, B, C, and D of FIG. 3) to capture images of objects within the area that the location determination service 130 can use to improve images stored in the rendered image database 150. Additionally, the application causes the user interface 420 to display an option for the rider to accept or reject the prompt to capture images. For example, the location determination service 130 may provide the rider with one or more incentives for capturing images (e.g., such as a 20% discount toward future transportation services, exclusive promotions, movie tickets, and the like). In one embodiment, the user interface 420 may display an overlay of computer-generated images superimposed over images captured via the camera 120 of the client device 110, where the superimposed images may comprise a series of arrows, or other such indicators, instructing the rider to aim the client device 110 toward the area known to include erroneous or outdated base map data. In response to determining that the client device 110 is not pointed toward the area known to include erroneous or outdated base map data (e.g., based on the orientation and position of the client device 110 as detected by sensors on the client device 110), the location determination service 130 transmits updated instructions for the rider to point the client device in an updated direction toward the identified area or object. For example, if the rider is unable to successfully aim the client device in accordance with the instructions comprising superimposed arrows, the location determination service 130 provides updated arrows instructing the rider to aim in the correct direction (e.g., by physically turning, tilting the client device, panning the client device, traveling closer to the area or object, and the like). In another embodiment, the location determination service 130 may provide the rider with an augmented reality (AR) gamification experience in which the rider is prompted to interact with virtual surroundings via the camera 120 of the client device 110. For example, the user interface 420 may include a prompt in the form of temporal, geospatial, and/or customizable AR content that provides the rider an incentive to remain engaged within the application while experiencing a long wait time. In one embodiment, this content might be presented to the rider as an AR advertisement. For example, the rider may be prompted to aim the client device 110 in various directions in an area known to include erroneous or outdated base map data to locate and view persistent geospatial AR virtual content, such as an advertisement or promotional content for a good or service. Furthermore, this virtual content may be customizable to cater to the preferences of the rider. For example, the location determination service 130 can retrieve information about the rider, such as previous destinations (e.g., movie theaters, sporting arenas, college campus, etc.), to determine the rider's interests and present virtual content targeted toward the rider. Additionally, virtual content may include promotional material with which the rider might interact, such as a virtual coupon or advertisement, for example.

In the example illustrated in FIG. 4, the user interface 420 of the client device 110 displays an AR gamification experience in which the rider is prompted to throw virtual basketballs 400 into a trash can 410 where the rim is highlighted using a persistent geospatial AR overlay 410. In this example, the client device 110 enables the rider to view a dynamic virtual world via the user interface 420 of the application while waiting for a driver at a pick-up location. While the rider attempts to throw virtual basketballs 400 through the AR overlay 410, the location determination service 130 collects the images captured by the client device 110 and stores the images in the rendered image database 150 with a refreshed timestamp. In this way, the AR gamification experience engages the rider with an activity during the increased wait time, and collects updated base map data to replace the erroneous or outdated base map data stored in the rendered image database 150.

Location Determination Service Functionality

FIG. 5 is a process flow diagram illustrating a process 500 for updating erroneous or outdated base map data, according to one embodiment. Process 500 begins with a service, such as a location determination service 130, receiving 510 a request for a transportation service from a client device 110 of a rider. Upon receiving the request, the location determination service 130 identifies the location of the rider and assigns a driver to service the transportation service request. In particular, the location determination service 130 identifies the rider (e.g., rider 300) and determines a threshold vicinity 310 in which a pick-up location may be designated based on information about the rider and/or the surrounding area. In alternative embodiments, the pick-up location may be selected without using the threshold vicinity 310 (e.g., where a rider selects the pick-up location manually, where the application suggests frequently used nearby pickup points, and the like). In such an embodiment, the threshold vicinity 310 may be calculated at another time (e.g., before or during element 540 described below).

As the driver travels to the designated pick-up location to pick up the rider, the location determination service 130 determines 520 if the rider's wait time for the transportation service exceeds a threshold wait time (e.g., as defined by an administrator of the location determination service 130). If the wait time does not exceed the threshold wait time, the rider continues to wait at the designated pick-up location for the driver. However, if the rider's wait time exceeds the threshold wait time, the location determination service 130 identifies 540 objects located in areas known to include erroneous or outdated base map data within the threshold vicinity 310 of the rider. For example, the location determination service 130 may identify a set of entries in the rendered image database 150 within the threshold vicinity having a timestamp that exceeds a threshold age with respect to the current time (e.g., an outdated timestamp). In another example, the location determination service 130 may identify entries in the rendered image database 150 having missing or corrupted data, such as an entry containing a file (e.g., an image file, a 3D map file, a rendering, etc.) that was not successfully received from the client device 110. In yet another example, entries representing areas known to undergo frequent changes in appearance or construct, such as a construction site, may be selected by the location determination service 130 to be included in the prompt.

The location determination service 130 sends 550 a prompt to the rider to capture, using the camera 120 of the client device, images of one or more of the objects within the areas known to include erroneous or outdated base map data. For example, if rider 300 in FIG. 3 accepts the prompt to capture images in area B for an incentive of a 20% discount for the transportation service, rider 300 is directed to area B by the location determination service 130 to capture the images using the client device 110. Location determination service 130 receives 560, from the client device 110, a rendering of images captured by the client device 110 and compares the received rendering to entries in the rendered image database 150, where each respective entry includes a respective rendering and a respective associated location. Location determination service 130 determines 410 whether the received rendering matches a respective rendering included in a respective entry in the database of renderings known to include erroneous or outdated base map data. Location determination service 130 compares the received rendering to entries in the rendered image database 150, each respective entry including a rendering, a timestamp, and an associated location that is within the threshold vicinity. For example, keypoints of the received rendering may be extracted and compared to keypoints of candidate renderings to determine whether a threshold amount of keypoints match. In some embodiments, to improve efficiency of computing, the location determination service 130 compares the received rendering to the entries by extracting geolocation data from the captured rendering. For example, even if GPS data obtained by client device 110 is erroneous, it is likely to be within a threshold distance from the actual location of client device 110. Location determination service 130 then determines a subset of the entries corresponding to the geolocation data. For example, location determination service 130 determines a radius of actual GPS coordinates that are within a threshold distance of a location indicated by the geolocation data. Location determination service 130 limits the comparing of the received rendering to the subset of the entries, thus ensuring a savings of processing time and power, as only entries that are within a threshold vicinity of the rider will be searched, as opposed to all entries of rendered image database 150.

The rendering may be an image itself, or a transformation of the image. In the case where the rendering is a transformation of the image, the client device may generate the rendering, or a module of location determination service 130 may generate the rendering upon receiving the image. To generate the rendering in the case where the rendering is a transformation of the image, client device 110 or location determination service 130 may generate a three-dimensional model of the captured image, and may register the three-dimensional model to three-dimensional content stored at rendered image database 150.

In some embodiments, the rendering is generated as part of a localization process (e.g., 2D-3D or 3D-3D localization). For example, client device 110 or location determination service 130 extracts 2D image features, e.g., using scale invariant feature transform ("SIFT"), object request broker ("ORB"), speed up robust features ("SURF"), or the like. In some embodiments, location determination service 130 or client device 110 builds a three-dimensional model from the captured image using a machine learned model.

Matching can be performed coarsely (e.g., as a first part of a process) by leveraging GPS to reduce the search space (e.g., to reduce the amount of database entries to be referenced, as discussed above and below). By using some large radius around a query image GPS position, the application isolates candidate renderings (e.g., images or 3D sections of the scene to match against). In some embodiments, the application performs further filtering by using the heading direction of the query image or 3D scene coordinates to align them to the base map (e.g., of a 2D or 3D model of known renderings) more readily. Additional techniques like vocab trees, bag of words or even machine learning can be used to quickly retrieve a matching set of images or 3D content.

The process of determining whether a received rendering matches a candidate rendering is also referred to as a process of "alignment" herein. Alignment refers to aligning a captured image to either stored isolated renderings that have known corresponding locations, or to a portion of a "base map" that stitches together known renderings into a model of the world, where each portion of the base map corresponds to a different location and is built from captured images of all locations that are informed by the base map. Location determination service 130 may perform 3D-3D alignment in a variety of ways. In some embodiments, location determination service 130 executes an iterative closest point (ICP) module to determine the 3D-3D alignment. Location determination service 130 may seed the 3D-3D alignment using machine-learned models that generate a segmentation by semantically segmenting the 3D scene of the base map. With that segmentation, location determination service 130 may determine a coarse alignment between similar semantic structures, such as car-to-car alignments, light post-to-light post alignments, and the like. With that coarse alignment, location determination service 130 may then revert to traditional ICP to perform the final precision alignment in an accelerated fashion.

In response to determining that the received rendering matches a rendering of an entry, location determination service 130 causes 570 the client device to activate a function in response to receiving the rendered images. The function may activate access to content on the client device that was previously made inaccessible to the rider. For example, the function may activate access to incentives such as discounts and/or promotional material for various goods or services via the application that were previously unavailable to the rider prior to capturing the images received by the location determination service 130. However, in response to determining that the received rendering does not match the rendering of the entry, location determination service 130 causes the client device to display updated instructions for the rider to point the client device 110 in a direction that captures images of the identified one or more objects.

Computing Hardware

Figure 6:
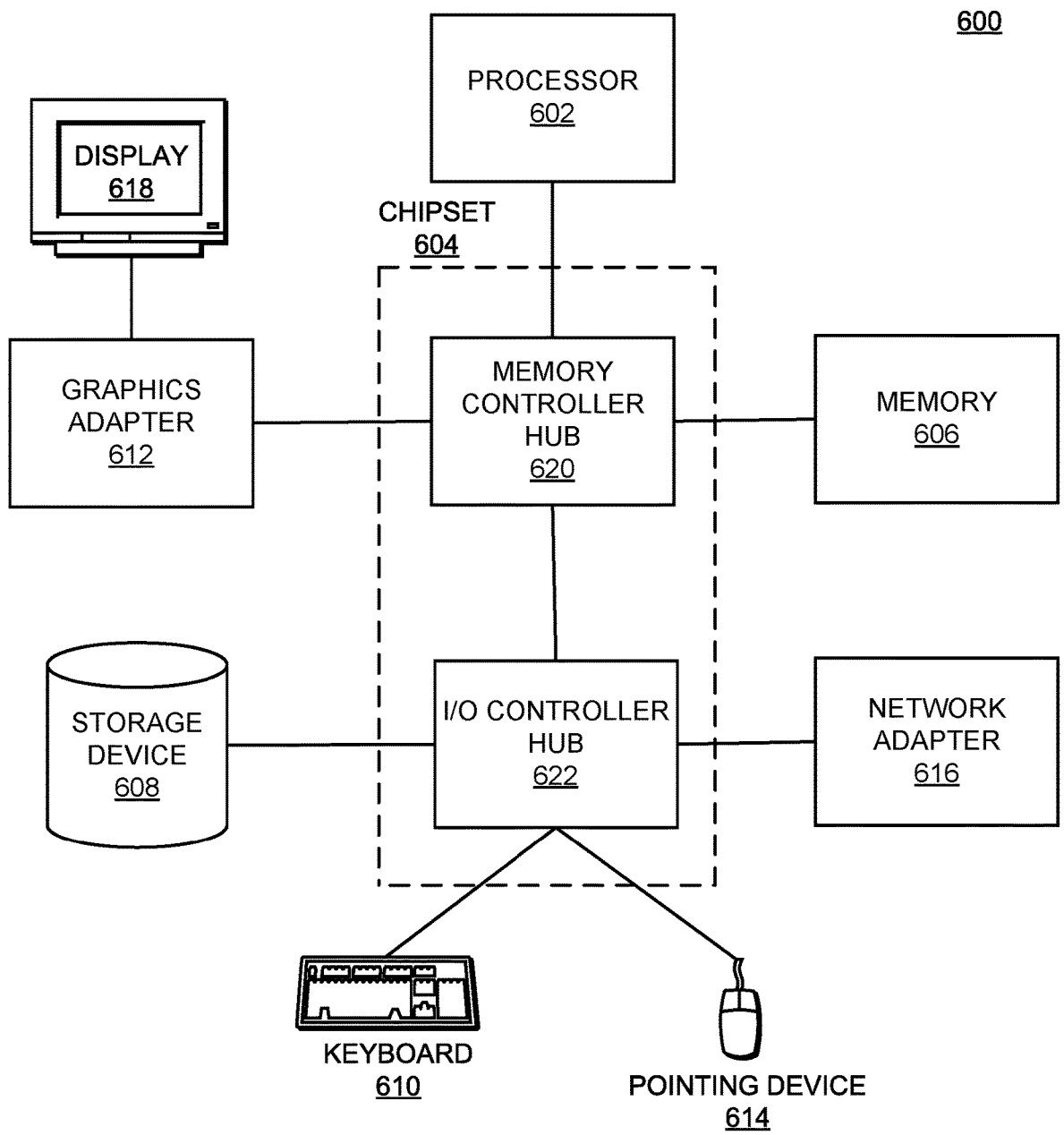
FIG. 6 is a block diagram that illustrates a computer system, according to one embodiment.

The entities shown in FIG. 1 are implemented using one or more computers. FIG. 6 is a block diagram that illustrates a computer system 600 for acting as a client 110 or location determination service 130, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 520 and an I/O controller hub 522.

In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 120.

As is known in the art, a computer 600 can have different and/or other components than those shown in FIG. 5. In addition, the computer 600 can lack certain illustrated components. For example, the computer acting as the location determination service 130 can be formed of multiple blade servers linked together into one or more distributed systems and lack components such as keyboards and displays. Moreover, the storage device 608 can be local and/or remote from the computer 600 (such as embodied within a storage area network (SAN)).

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, from a client device, a request for a transportation service;
determining that a wait time for the transportation service exceeds a threshold wait time;
in response to determining that the wait time exceeds the threshold wait time, identifying an object within a threshold vicinity of a location of the client device, the identified object lacking a current rendering in association with a location;
transmitting, to the client device, a prompt for a user of the client device to capture an image of the identified object in the associated location;
receiving, from the client device, a rendering of the image;
causing the client device to activate a function in response to receiving the rendering.

2. The computer-implemented method of claim 1, wherein identifying the object within the threshold vicinity of the location of the client device further comprises:
maintaining a rendered image database comprising a plurality of entries, each entry in the rendered image database including a rendered image of an object, a timestamp, and an associated location;
identifying a set of the plurality of entries having objects within the threshold vicinity of the location of the client device based on comparing associated locations of each of the plurality of entries with a range of locations within the threshold vicinity;
identifying, from the set of entries, an entry having a timestamp that exceeds a threshold age with respect to a current time; and
selecting the identified object based on the entry having the timestamp that exceeds the threshold age.

3. The computer-implemented method of claim 1, further comprising:
determining the threshold vicinity based on the wait time for the transportation service, wherein a larger threshold vicinity corresponds to a longer wait time, and wherein a smaller threshold vicinity corresponds to a shorter wait time.

4. The computer-implemented method of claim 1, further comprising:
determining a pick-up location for the user of the client device based on a route for the transportation service that corresponds to parameters of the request; and
determining an area that the threshold vicinity encompasses based on the pick-up location for the user of the client device and a location of the client device at a time at which the request was received.

5. The computer-implemented method of claim 4, further comprising:
causing a user interface of the client device to designate the pick-up location for the user of the client device; and
causing the user interface of the client device to designate the identified object in the associated location.

6. The computer-implemented method of claim 1, wherein transmitting the prompt for the user of the client device to capture the image of the identified object comprises:
transmitting, to the client device, instructions for the user of the client device to point the client device in a particular direction toward the identified object;
determining whether the client device is pointed in the particular direction toward the identified object, the client device capturing images of the identified object; and
in response to determining that the client device is not pointed in the particular direction toward the identified object, transmitting, to the client device, updated instructions for the user of the client device to point the client device in an updated direction toward the identified object.

7. The computer-implemented method of claim 6, further comprising:
in response to determining that the client device is pointed in the particular direction toward the identified object, generating persistent geospatial content for display on the client device, the persistent geospatial content comprising an overlay on top of the identified object within a context of images captured by the client device.

8. The computer-implemented method of claim 1, wherein causing the client device to activate a function in response to receiving the rendering further comprises:
determining whether the received rendering of the image is a rendering of the image of the identified object in the associated location included in the prompt; and
in response to determining that the received rendering of the image is the rendering of the image of the identified object, activating access to previously inaccessible content at the client device, wherein the content was previously made inaccessible to the client device by the transportation service.

9. A non-transitory computer-readable storage medium storing computer program instructions executable by a processor to perform operations for estimating a location of a client device, the operations comprising:
receiving, from a client device, a request for a transportation service;
determining whether a wait time for the transportation service exceeds a threshold wait time;
in response to determining that the wait time exceeds the threshold wait time, identifying an object within a threshold vicinity of a location of the client device, the identified object lacking a current rendering in association with a location;
transmitting, to the client device, a prompt for a user of the client device to capture an image of the identified object in the associated location;
receiving, from the client device, a rendering of the image; and
causing the client device to activate a function in response to receiving the rendering.

10. The non-transitory computer-readable storage medium of claim 9, wherein identifying the object within the threshold vicinity of the location of the client device further comprises:
maintaining a rendered image database comprising a plurality of entries, each entry in the rendered image database including a rendered image of an object, a timestamp, and an associated location;
identifying a set of the plurality of entries having objects within the threshold vicinity of the location of the client device based on comparing associated locations of each of the plurality of entries with a range of locations within the threshold vicinity;
identifying, from the set of entries, an entry having a timestamp that exceeds a threshold age with respect to a current time; and
selecting the identified object based on the entry having the timestamp that exceeds the threshold age.

11. The non-transitory computer-readable storage medium of claim 9, further comprising:
determining the threshold vicinity based on the wait time for the transportation service, wherein a larger threshold vicinity corresponds to a longer wait time, and wherein a smaller threshold vicinity corresponds to a shorter wait time.

12. The non-transitory computer-readable storage medium of claim 9, further comprising:
determining a pick-up location for the user of the client device based on a route for the transportation service that corresponds to parameters of the request; and
determining an area that the threshold vicinity encompasses based on the pick-up location for the user of the client device and a location of the client device at a time at which the request was received.

13. The non-transitory computer-readable storage medium of claim 12, further comprising:
causing a user interface of the client device to designate the pick-up location for the user of the client device; and
causing the user interface of the client device to designate the identified object in the associated location.

14. The non-transitory computer-readable storage medium of claim 9, wherein transmitting the prompt for the user of the client device to capture the image of the identified object comprises:
transmitting, to the client device, instructions for the user of the client device to point the client device in a particular direction toward the identified object;
determining whether the client device is pointed in the particular direction toward the identified object, the client device capturing images of the identified object; and
in response to determining that the client device is not pointed in the particular direction toward the identified object, transmitting, to the client device, updated instructions for the user of the client device to point the client device in an updated direction toward the identified object.

15. The non-transitory computer-readable storage medium of claim 14, further comprising:
in response to determining that the client device is pointed in the particular direction toward the identified object, generating persistent geospatial content for display on the client device, the persistent geospatial content comprising an overlay on top of the identified object within a context of images captured by the client device.

16. The non-transitory computer-readable storage medium of claim 9, wherein causing the client device to activate a function in response to receiving the rendering further comprises:
determining whether the received rendering of the image is a rendering of the image of the identified object in the associated location included in the prompt; and
in response to determining that the received rendering of the image is the rendering of the image of the identified object, activating access to previously inaccessible content at the client device, wherein the content was previously made inaccessible to the client device by the transportation service.

17. A system, comprising:
a processor for executing computer program instructions; and
a non-transitory computer-readable storage medium storing computer program instructions executable by the processor to perform operations for estimating a location of a client device, the operations comprising:
receiving, from a client device, a request for a transportation service;
determining whether a wait time for the transportation service exceeds a threshold wait time;
in response to determining that the wait time exceeds the threshold wait time, identifying an object within a threshold vicinity of a location of the client device, the identified object lacking a current rendering in association with a location;
transmitting, to the client device, a prompt for a user of the client device to capture an image of the identified object in the associated location;
receiving, from the client device, a rendering of the image; and
causing the client device to activate a function in response to receiving the rendering.

18. The system of claim 17, wherein identifying the object within the threshold vicinity of the location of the client device further comprises:
maintaining a rendered image database comprising a plurality of entries, each entry in the rendered image database including a rendered image of an object, a timestamp, and an associated location;

identifying a set of the plurality of entries having objects within the threshold vicinity of the location of the client device based on comparing associated locations of each of the plurality of entries with a range of locations within the threshold vicinity;

identifying, from the set of entries, an entry having a timestamp that exceeds a threshold age with respect to a current time; and selecting the identified object based on the entry having the timestamp that exceeds the threshold age.

19. The system of claim 17, further comprising:

determining the threshold vicinity based on the wait time for the transportation service, wherein a larger threshold vicinity corresponds to a longer wait time, and wherein a smaller threshold vicinity corresponds to a shorter wait time.

20. The system of claim 17, further comprising:

determining a pick-up location for the user of the client device based on a route for the transportation service that corresponds to parameters of the request; and determining an area that the threshold vicinity encompasses based on the pick-up location for the user of the client device and a location of the client device at a time at which the request was received.

* * * * *

UNITED STATES PATENT AND TRADEMARK OFFICE
CERTIFICATE OF CORRECTION

| | | |
|---|---|---|
| PATENT NO. | : 11,527,060 B2 | Page 1 of 1 |
| APPLICATION NO. | : 16/712835 | |
| DATED | : December 13, 2022 | |
| INVENTOR(S) | : Aaron Matthew Rogan | |

It is certified that error appears in the above-identified patent and that said Letters Patent is hereby corrected as shown below:

In the Claims

In Column 11, in Claim 1, Line 56, after "image;" insert -- and --.

Signed and Sealed this
Sixth Day of June, 2023

Katherine Kelly Vidal
*Director of the United States Patent and Trademark Office*